(12) United States Patent
Curtsinger

(10) Patent No.: US 8,011,986 B1
(45) Date of Patent: Sep. 6, 2011

(54) INFLATABLE BUOYANT TENT APPARATUS

(76) Inventor: Clay A. Curtsinger, Worthville, KY (US)

( * ) Notice: Subject to any disclaimer, the term of this patent is extended or adjusted under 35 U.S.C. 154(b) by 117 days.

(21) Appl. No.: 12/605,107

(22) Filed: Oct. 23, 2009

(51) Int. Cl.
B63B 9/04 (2006.01)
(52) U.S. Cl. ............................. 441/35; 441/40; 52/2.23
(58) Field of Classification Search .................... 441/38, 441/40; 52/2.23
See application file for complete search history.

(56) References Cited

U.S. PATENT DOCUMENTS

| 2,908,919 | A | * | 10/1959 | Bicknell et al. ................. 441/38 |
| 3,054,124 | A | | 9/1962 | Silverstone |
| 3,415,719 | A | | 12/1968 | Telkes |
| 3,456,403 | A | * | 7/1969 | Batterson ....................... 52/2.19 |
| 3,457,684 | A | * | 7/1969 | Wood, Jr. ........................ 52/2.21 |
| 4,000,585 | A | * | 1/1977 | Denaro .......................... 52/2.17 |
| 4,335,545 | A | * | 6/1982 | Couch ............................ 52/2.19 |
| 4,766,918 | A | | 8/1988 | Odekirk |
| D363,993 | S | | 11/1995 | Johnson et al. |
| 5,669,182 | A | * | 9/1997 | Griffis ............................ 52/2.18 |
| 5,718,612 | A | * | 2/1998 | Elsholz .......................... 441/38 |
| D430,845 | S | * | 9/2000 | Elsholz ........................ D12/316 |
| 6,325,688 | B1 | | 12/2001 | Martin |
| 6,367,404 | B1 | * | 4/2002 | Callahan ....................... 114/353 |
| 7,056,179 | B2 | | 6/2006 | Courtney |
| 2005/0004423 | A1 | * | 1/2005 | Shenosky et al. ............... 600/21 |
| 2005/0163965 | A1 | * | 7/2005 | Velicki et al. ................. 428/119 |

* cited by examiner

Primary Examiner — Stephen Avila
(74) Attorney, Agent, or Firm — Crossley Patent Law; Mark A. Crossley

(57) ABSTRACT

The inflatable buoyant tent apparatus provides a buoyant shelter for use on water. The apparatus is deflatable and inflatable except for the battery pack, alarm, pump, and pressure sensor. The apparatus is therefore compactly transported. The included switched air pump provides for automatic inflation. The most complete apparatus embodiment provides a spine and ribs that ensure rigidity of the tent. Rigidity for the float chamber is aided by corrugations that extend from the chamber first end to the chamber second end. The pressure sensor provides constant monitoring of the inflatable apparatus, with automatic pump operation initiated at a given low pressure setting, and automatic pump cessation upon the apparatus reaching a given air pressure. The beacon atop the tent provides clear visibility of the apparatus, especially at night, to ensure the safety of the apparatus and anyone within the tent. Tent flaps are provided for each end of the tent.

11 Claims, 3 Drawing Sheets

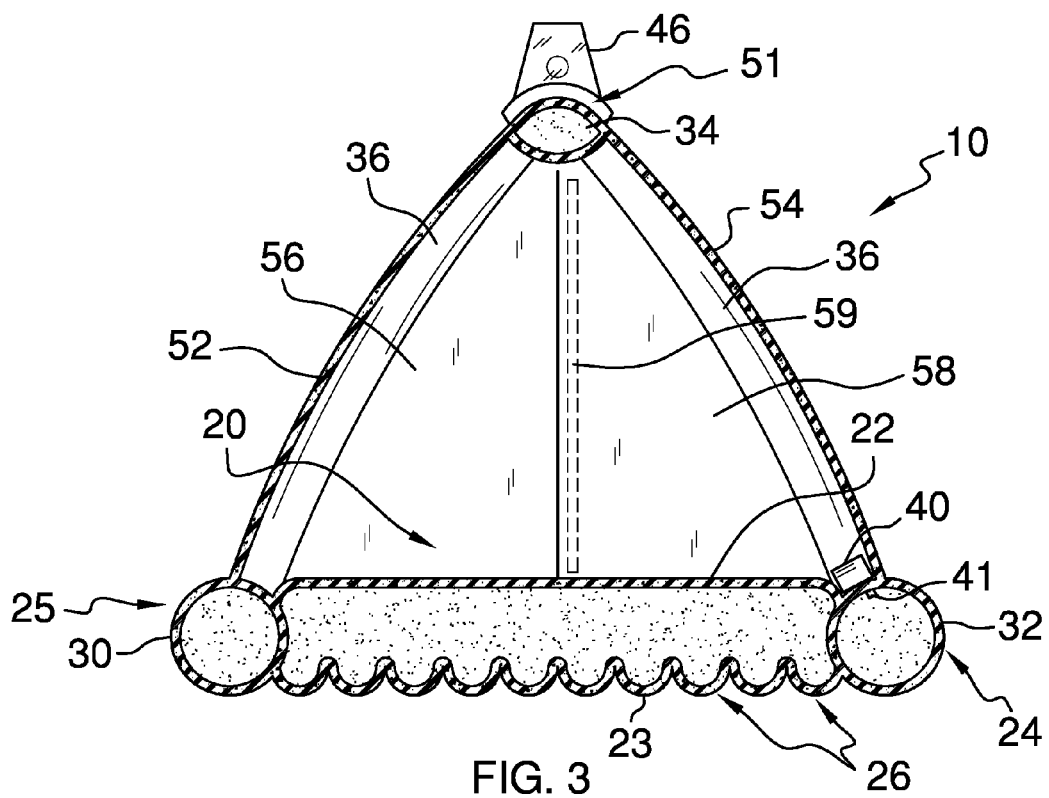
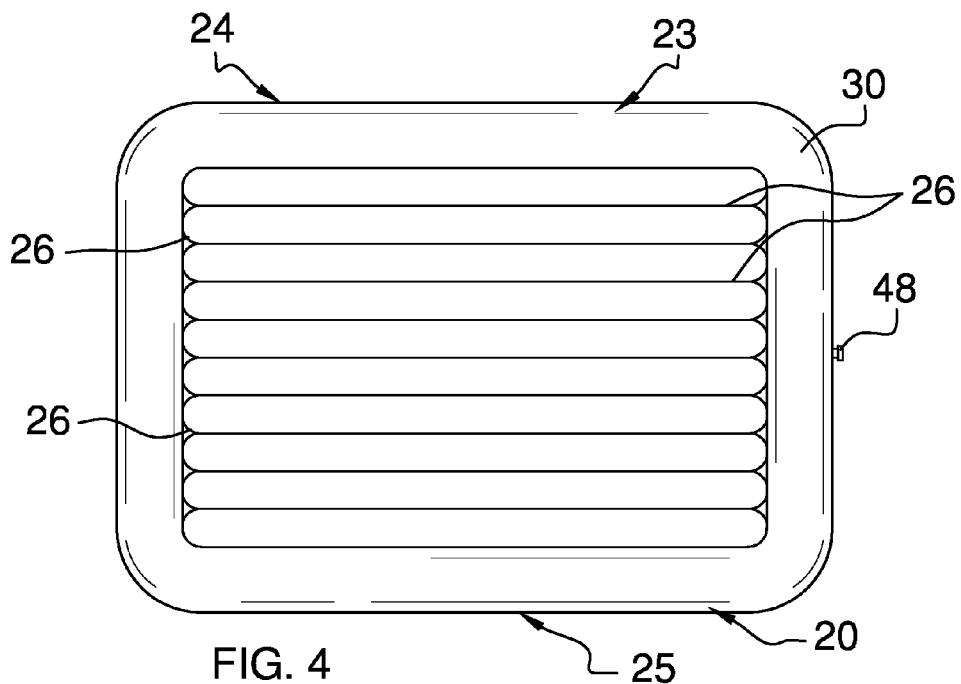

INFLATABLE BUOYANT TENT APPARATUS

BACKGROUND OF THE INVENTION

Personal water craft users have often wished for a way to sleep on the water, instead of returning to a shore based camp or having to have a boat. Yet, prior to now, no such devices have been available. The present apparatus provides an inflatable buoyant tent apparatus that can be transported to any water location and floated there, whether to be used as a shelter or overnight accommodation.

FIELD OF THE INVENTION

The inflatable buoyant tent apparatus relates to shelters such as tents and more especially to an inflatable tent apparatus that floats and also provides safety features.

SUMMARY OF THE INVENTION

The general purpose of the inflatable buoyant tent apparatus, described subsequently in greater detail, is to provide a inflatable buoyant tent apparatus which has many novel features that result in an improved inflatable buoyant tent apparatus which is not anticipated, rendered obvious, suggested, or even implied by prior art, either alone or in combination thereof.

To attain this, the inflatable buoyant tent apparatus provides a buoyant shelter for use on water. The apparatus is deflatable and inflatable except for the battery pack, alarm, pump, and pressure sensor. The apparatus is therefore compactly transported. The included switched air pump provides for inflation. The most complete apparatus embodiment provides a spine and ribs that provide rigidity for the tent. Rigidity for the float chamber is aided by the corrugations that extend from the chamber first end to the chamber second end. The pressure sensor provides constant monitoring of the inflatable apparatus, with automatic pump operation initiated at a given low pressure setting, and automatic pump cessation upon the apparatus reaching a given air pressure. The beacon atop the tent provides clear visibility of the apparatus, especially at night, to ensure the safety of the apparatus and anyone within the tent. The most complete embodiment provides tent flaps for each end of the tent. Closures on the tent flaps of each apparatus end provide more secure shelter against elements.

Thus has been broadly outlined the more important features of the improved inflatable buoyant tent apparatus so that the detailed description thereof that follows may be better understood and in order that the present contribution to the art may be better appreciated.

An object of the inflatable buoyant tent apparatus is to provide a floating shelter.

Another object of the inflatable buoyant tent apparatus is to a portable shelter.

A further object of the inflatable buoyant tent apparatus is to lightweight shelter.

An added object of the inflatable buoyant tent apparatus is to provide a safety warning of internal pressure loss.

And, an object of the inflatable buoyant tent apparatus is to a visual alert of apparatus presence.

These together with additional objects, features and advantages of the improved inflatable buoyant tent apparatus will be readily apparent to those of ordinary skill in the art upon reading the following detailed description of presently preferred, but nonetheless illustrative, embodiments of the improved inflatable buoyant tent apparatus when taken in conjunction with the accompanying drawings.

In this respect, before explaining the current embodiments of the improved inflatable buoyant tent apparatus in detail, it is to be understood that the inflatable buoyant tent apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved inflatable buoyant tent apparatus. It is therefore important that the claims be regarded as including such equivalent constructions insofar as they do not depart from the spirit and scope of the inflatable buoyant tent apparatus. It is also to be understood that the phraseology and terminology employed herein are for purposes of description and should not be regarded as limiting.

BRIEF DESCRIPTION OF THE DRAWINGS

FIG. 3 is a cross sectional view of FIG. 1, taken along the line 3-3.
FIG. 4 is a bottom plan view.

DETAILED DESCRIPTION OF THE DRAWINGS

With reference now to the drawings, and in particular FIGS. 1 through 6 thereof, the principles and concepts of the inflatable buoyant tent apparatus generally designated by the reference number 10 will be described.

Figure 1:
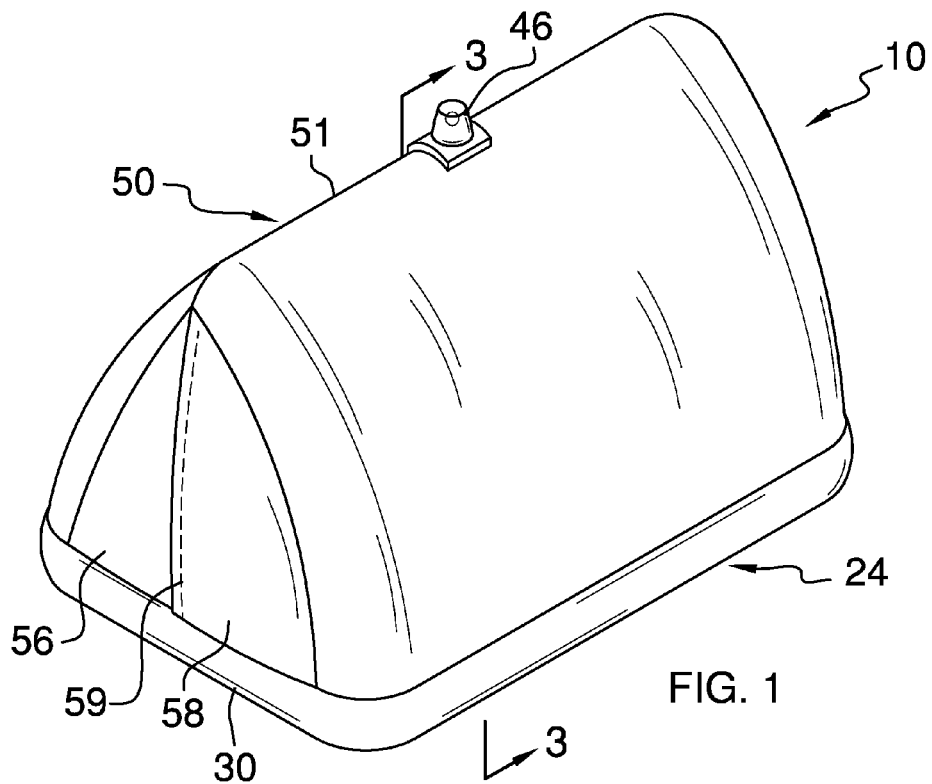
FIG. 1 is a perspective view.

Referring to FIGS. 1, 3, and 4, the apparatus 10 partially comprises a first end 27 spaced apart from a second end 28. The apparatus 10 is ideally rectangularly shaped but is also provided in other shapes. The apparatus 10 further comprises an inflatable float chamber 20 having a top 22 spaced apart from a bottom 23, and a first side 24 spaced apart from a second side 25. The plurality of corrugations 26 is disposed on the float chamber 20 bottom 23. The plurality of corrugations 26 is ideally longitudinally disposed from the first end 27 to the second end 28. The inflatable integrated perimeter pontoon 30 surrounds the float chamber 20. The tent 50 is disposed atop the integrated perimeter pontoon 30. The tent 50 has a first tent wall 52 connected to the integrated perimeter pontoon 30 disposed on the float chamber 20 first side 24, and a second tent wall 54 connected to the integrated perimeter pontoon 30 disposed on the float chamber 20 second side 25. The tent walls are joined at the tent 20 top 22. The tow hook 48 is extended outwardly from the pontoon 30.

Figure 2:
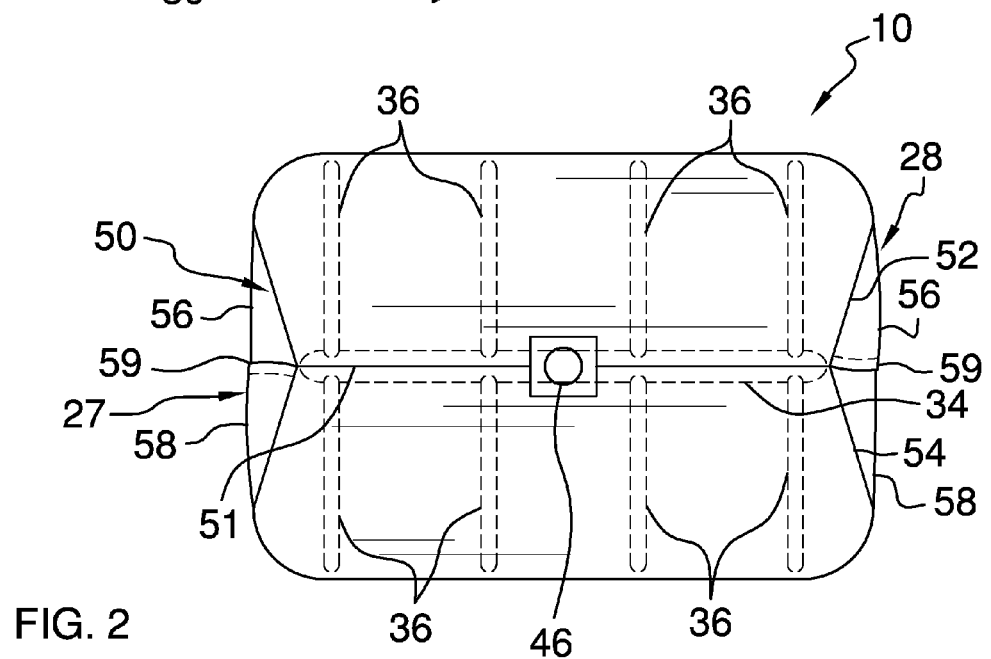
FIG. 2 is a top plan view.

Referring to FIG. 2 and continuing to refer to FIGS. 1 and 3, the inflatable spine 34 is disposed within the tent 20 top 22. The spine 34 extends from the tent 20 first end 27 to the tent 20 second end 28. The plurality of spaced apart inflatable ribs 36 is extended laterally from the spine 34.

The ribs 36 are affixed within the tent walls. The spine 34, ribs 36, integrated perimeter pontoon 30, and float chamber 20 are in airway communication.

Figure 5:
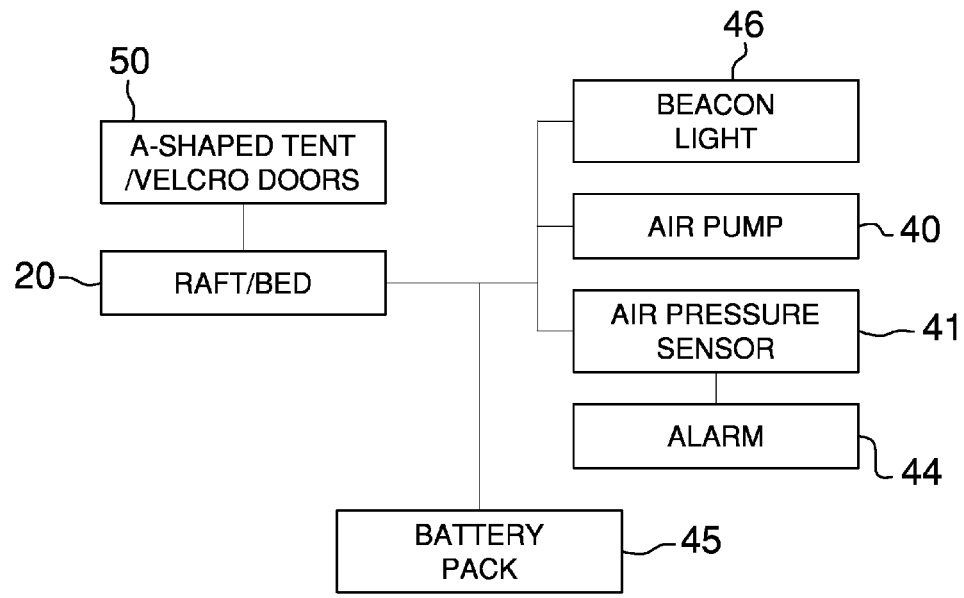
FIG. 5 is a schematic block diagram of the electronic components' relationship to the tent and float chamber.

Referring again to FIGS. 1, 2, and 3, and to FIG. 5, a pair of flaps is disposed between the tent walls of the tent 50 first end 27. The flaps comprise the first flap 56 and the second flap 58. The closure 59 selectively affixes the first flap 56 to the second flap 58. A pair of flaps is disposed between the tent walls of the tent 50 second end 28. The flaps comprising the first flap 56 and the second flap 58. A closure 59 selectively affixes the first flap 56 to the second flap 58. The beacon 46 is affixed to the tent top 51. The air pump 40 is disposed within one of the tent walls. The air pressure sensor 41 is disposed in the integrated perimeter pontoon 30. The air pressure sensor 41 is in communication with the air pump 40. The alarm 44 is in communication with the air pressure sensor 41. Should air pressure drop below a specified level, the alarm 44 sounds and the pump 40 is activated to restore pressure within the spine 34, the ribs 36, the float chamber 20 and the integrated perimeter pontoon 30. The battery pack 45 is in communication with the beacon 46, the air pump 40, and the alarm 44.

Figure 6:
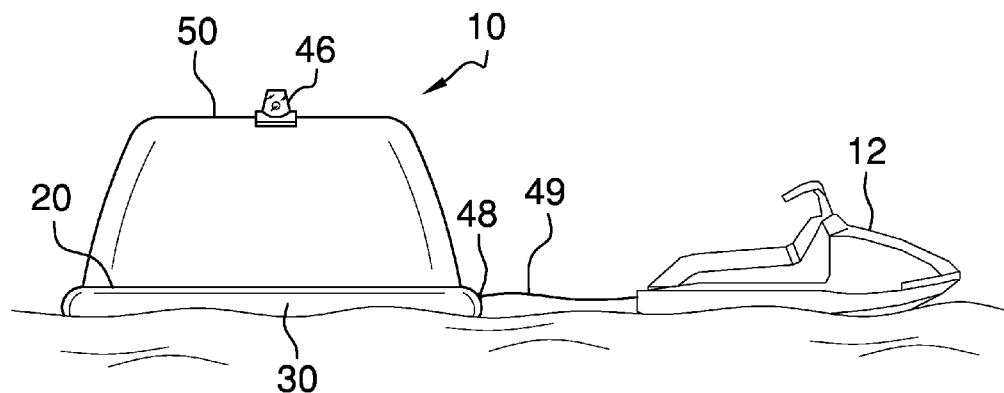
FIG. 6 is a lateral elevation view of the apparatus in tow with a jet ski.

Referring to FIG. 6, the tether 49 is removably hooked to the tow hook 48 to aid in transport of the apparatus 10. The existing jet ski 12 provides an excellent example of apparatus 10 use.

With respect to the above description then, it is to be realized that the optimum dimensional relationships for the parts of the inflatable buoyant tent apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the inflatable buoyant tent apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the inflatable buoyant tent apparatus may be used.

Therefore, the foregoing is considered as illustrative only of the principles of the inflatable buoyant tent apparatus. Further, since numerous modifications and changes will readily occur to those skilled in the art, it is not desired to limit the inflatable buoyant tent apparatus to the exact construction and operation shown and described, and accordingly, all suitable modifications and equivalents may be resorted to, falling within the scope of the inflatable buoyant tent apparatus.

What is claimed is:

1. An inflatable buoyant tent apparatus, comprising, in combination:
   a first end spaced apart from a second end;
   an inflatable float chamber having a top spaced apart from a bottom, a first side spaced apart from a second side;
   a plurality of corrugations disposed on the float chamber bottom;
   an inflatable integrated perimeter pontoon surrounding the float chamber;
   a tow hook affixed to the pontoon;
   a tent disposed atop the integrated perimeter pontoon, the tent having a first tent wall connected to the integrated perimeter pontoon disposed on the float chamber first side, a second tent wall connected to the integrated perimeter disposed on the float chamber second side, the tent walls joined at a tent top;
   a plurality of inflatable spaced apart ribs extended laterally on an interior of the tent, the ribs affixed to the tent walls; the ribs, integrated perimeter pontoon, and float chamber in airway communication;
   a pair of identical flaps disposed between the tent walls of the tent first end, the flaps comprising a first flap and a second flap;
   a pair of identical flaps disposed between the tent walls of the tent second end, the flaps comprising a first flap and a second flap;
   a closure selectively affixing the first flap to the second flap;
   an air pump disposed within one of the tent walls;
   an air pressure sensor disposed in the integrated perimeter pontoon, the air pressure sensor in communication with the air pump;
   an alarm in communication with the air pressure sensor;
   a battery pack in communication with the air pump and the alarm.

2. The apparatus according to claim 1 wherein the float chamber is further a rectangular shape.

3. The apparatus according to claim 1 wherein the plurality of corrugations is further longitudinally disposed from the first end to the second end.

4. The apparatus according to claim 2 wherein the plurality of corrugations is further longitudinally disposed from the first end to the second end.

5. The apparatus according to claim 1 further comprising a beacon affixed to the tent top, the beacon in communication with the battery pack.

6. The apparatus according to claim 2 further comprising a beacon affixed to the tent top, the beacon in communication with the battery pack.

7. The apparatus according to claim 3 further comprising a beacon affixed to the tent top, the beacon in communication with the battery pack.

8. An inflatable buoyant tent apparatus, comprising, in combination:
   a first end spaced apart from a second end;
   an inflatable float chamber having a top spaced apart from a bottom, a first side spaced apart from a second side;
   a plurality of corrugations disposed on the float chamber bottom;
   an inflatable integrated perimeter pontoon surrounding the float chamber;
   a tow hook affixed to the pontoon;
   a tent disposed atop the integrated perimeter pontoon, the tent having a first tent wall connected to the integrated perimeter pontoon disposed on the float chamber first side, a second tent wall connected to the integrated perimeter pontoon disposed on the float chamber second side, the tent walls joined at a tent top;
   an inflatable spine disposed within the tent top, the spine extended from the tent first end to the tent second end;
   a plurality of inflatable spaced apart ribs extended laterally from the spine, the ribs affixed within the tent walls, the ribs extended from the spine to the integrated perimeter pontoon;
   the spine, ribs, integrated perimeter pontoon, and float chamber in airway communication;
   a pair of identical flaps disposed between the tent walls of the tent first end and the second end, the flaps comprising a first flap and a second flap;
   a closure selectively affixing the first flap to the second flap;
   a beacon affixed to the tent top;
   an air pump disposed within one of the tent walls;
   an air pressure sensor disposed in the integrated perimeter pontoon, the air pressure sensor in communication with the air pump;
   an alarm in communication with the air pressure sensor;
   a battery pack in communication with the beacon, the air pump, and the alarm.

9. The apparatus according to claim 8 wherein the float chamber is further a rectangular shape.

10. The apparatus according to claim 8 wherein the plurality of corrugations is further longitudinally disposed from the first end to the second end.

11. The apparatus according to claim 9 wherein the plurality of corrugations is further longitudinally disposed from the first end to the second end.

* * * * *